(12) United States Patent
Maniktala et al.

(10) Patent No.: US 9,954,398 B2
(45) Date of Patent: Apr. 24, 2018

(54) SUPPRESSION OF AUDIBLE HARMONICS IN WIRELESS POWER RECEIVERS

(71) Applicant: Integrated Device Technology, Inc., San Jose, CA (US)

(72) Inventors: Sanjaya Maniktala, Fremont, CA (US); Jose Rangel, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 688 days.

(21) Appl. No.: 14/498,941

(22) Filed: Sep. 26, 2014

(65) Prior Publication Data

US 2016/0094042 A1 Mar. 31, 2016

(51) Int. Cl.
*H02J 5/00* (2016.01)
*H02J 50/12* (2016.01)
*H02M 1/12* (2006.01)

(52) U.S. Cl.
CPC .............. *H02J 50/12* (2016.02); *H02M 1/12* (2013.01)

(58) Field of Classification Search
CPC .................................. H02J 50/12; H02M 1/12
See application file for complete search history.

(56) References Cited

U.S. PATENT DOCUMENTS

| | | | |
|---|---|---|---|
| 2011/0127953 A1* | 6/2011 | Walley | G06K 7/10207 320/108 |
| 2011/0127954 A1* | 6/2011 | Walley | H01M 2/0267 320/108 |
| 2013/0257360 A1 | 10/2013 | Singh | |
| 2013/0260676 A1 | 10/2013 | Singh | |
| 2014/0265614 A1* | 9/2014 | Kim | H01F 38/14 307/104 |

* cited by examiner

*Primary Examiner* — Jared Fureman
*Assistant Examiner* — Emmanuel R Dominique
(74) *Attorney, Agent, or Firm* — Haynes and Boone, LLP

(57) ABSTRACT

A wireless power enabled apparatus includes a wireless power receiver. The wireless power receiver includes a receive coil, a rectifier, a regulator, and a damping circuit. The receive coil is configured to generate an AC power signal responsive to a wireless power signal. The rectifier is configured to receive the AC power signal and generate a DC rectified power signal relative to a rectified ground signal. The regulator is operably coupled with the rectifier to receive the DC rectified power signal and generate an output voltage. The damping circuit is operably coupled between the DC rectified power signal and the rectified ground signal and in parallel with the regulator. The damping circuit is configured to suppress audible harmonics generated by the wireless power receiver at some loads by providing a damping impedance for the DC rectified power signal.

20 Claims, 5 Drawing Sheets

SUPPRESSION OF AUDIBLE HARMONICS IN WIRELESS POWER RECEIVERS

FIELD

Embodiments of the present disclosure relate generally to wireless power transfer and, more particularly, to apparatuses and related methods for wireless power receivers.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space and one needs to find a suitable outlet for the adaptor. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy and the required efficiency. The coupling coefficient (k) is a function of the distance between the coils, the coil sizes, and materials. The power conversion efficiency (e.g., coupling factor, coupling quality) may be significantly improved if the coils are sized and operated at such a frequency that they are physically within the so-called "near-field zone" of each other.

BRIEF SUMMARY

Embodiments of the present disclosure include a wireless power enabled apparatus, which includes a wireless power receiver. The wireless power receiver includes a receive coil, a rectifier, a regulator, and a damping circuit. The receive coil is configured to generate an AC power signal responsive to a wireless power signal. The rectifier is configured to receive the AC power signal and generate a DC rectified power signal relative to a rectified ground signal. The regulator is operably coupled with the rectifier to receive the DC rectified power signal and generate an output voltage. The damping circuit is operably coupled between the DC rectified power signal and the rectified ground signal and in parallel with the regulator. The damping circuit is configured to suppress audible harmonics generated by the wireless power receiver at some loads by providing a damping impedance for the DC rectified power signal.

Embodiments of the present disclosure also include a wireless power receiver including a receive coil configured to generate an AC power signal at a resonant frequency responsive to a wireless power signal. A rectifier is configured to receive the AC power signal and generate a rectified voltage and a rectified ground in response thereto. A regulator is configured to receive the rectified voltage and generate an output voltage in response thereto. A damping circuit is operably coupled between the rectified voltage and the rectified ground, the damping circuit is configured to suppress sideband frequencies relative to the resonant frequency wherein the sideband frequencies generate audible harmonics at some loads on the regulator when the sideband frequencies are not suppressed.

Still other embodiments of the present disclosure include a method of operating a receiver side of a wireless power transfer system. The method includes generating an AC power signal responsive to a wireless power signal exciting a receive coil at a resonant frequency. The AC power signal is rectified to generate a DC rectified power signal and a rectified ground signal. An output voltage signal is generated from the DC rectified power signal with a voltage regulator. Sideband frequencies relative to the resonant frequency are suppressed by providing a damping impedance between the DC rectified power signal and the rectified ground signal the damping impedance, wherein the sideband frequencies generate audible harmonics at some loads when the sideband frequencies are not suppressed.

DETAILED DESCRIPTION

Figure 1:
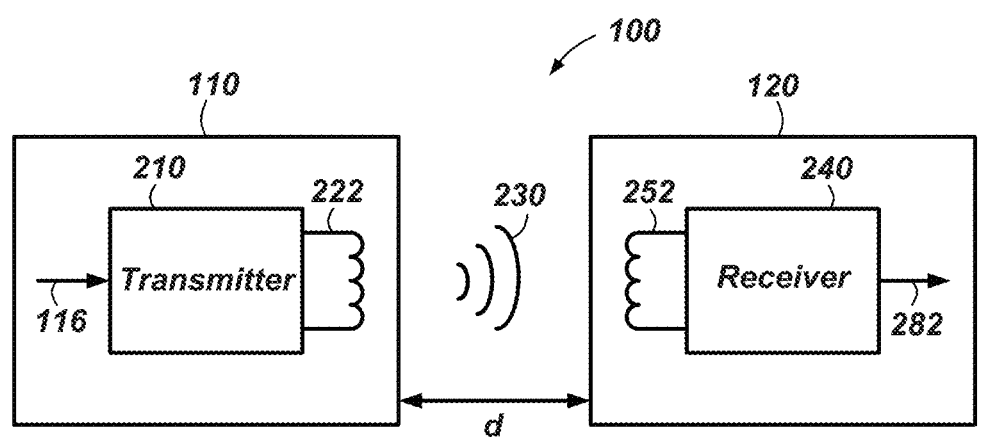
FIG. 1 is a schematic block diagram of a wireless power transfer system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

When describing circuit elements, such as, for example, resistors, capacitors, and transistors, designators for the circuit elements begin with an element type designator (e.g., R, C, M) followed by a numeric indicator. Circuit element numbers may be repeated on different drawings and are not to be considered the same element unless expressly indicated as such. In other words, a capacitor C1 on FIG. 1 is a different element from a capacitor C1 on FIG. 6. Power sources such as, for example VDD and VCC as well as ground voltages may be generically indicated. When appropriate, these power signals may be described in detail. In other cases, the power signals may not be described, as it would be apparent to a person of ordinary skill in the art which power signal should be used. As a non-limiting example, it may be appropriate to maintain separate analog and digital grounds and a person of ordinary skill in the art would understand which is the appropriate ground for a specific circuit.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

It should be recognized that the devices of a wireless power transfer system are described herein primarily with respect to functionality of wireless power transfer; however, it should be recognized that the wireless power transfer system may include additional components to perform other features not specifically described herein or shown in the various figures, such as, for example, communication. As other examples, wireless power enabled devices may include foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods that are configured to modulate the power generated by the wireless power receiver.

FIG. 1 is a schematic block diagram of a wireless power transfer system 200. The wireless power transfer system 200 includes a wireless power transmitting apparatus 110, and a wireless power receiving apparatus 120. The wireless power transmitting apparatus 110 includes a wireless power transmitter 210 having a transmit coil 222 configured to generate a wireless power signal 230 (e.g., electric field, magnetic field, electromagnetic field, etc.) for providing power transfer to the wireless power receiving apparatus 120. The wireless power receiving apparatus 120 includes a wireless power receiver 240 having a receive coil 252 configured to electromagnetically couple with the wireless power signal 230. The transmit coil 222 and the receive coil 252 may be sized according to the particular devices and applications to be associated therewith.

An input signal 116 may be provided to the wireless power transmitter 210 for generating the wireless power signal 230 that provides a power transfer to the wireless power receiving apparatus 120. The wireless power receiver 240 may couple to the wireless power signal 230 and may generate an output voltage 282 in response thereto. The output voltage 282 may provide the power that is used by the wireless power receiving apparatus 120 for storing (e.g., charging a battery), consumption (e.g., providing system power), or a combination thereof.

The wireless power transmitter 210 and the wireless power receiver 240 are separated by a distance (d). In some embodiments, the wireless power transmitter 210 and the wireless power receiver 240 may be configured according to a mutual inductance relationship, such that when the resonant frequency of the wireless power receiver 240 and the resonant frequency of the wireless power transmitter 210 are substantially identical, transmission losses between the wireless power transmitter 210 and the wireless power receiver 240 are minimal. Likewise, the frequency of the wireless power signal 230 may be set by the wireless power transmitter 210 at or near the resonant frequencies of the coils (114, 124). As a result, an effective power transfer may occur by coupling a large portion of the energy in the near-field of the transmit coil 222 to the receive coil 252 rather than propagating most of the energy in an electromagnetic wave to the far-field. If the wireless power receiving apparatus 120 is in the near-field (within some distance (d)), inductive coupling may occur between the transmit coil 222 and the receive coil 252. The area around the transmit coil 222 and the receive coil 252 where this near-field inductive coupling may occur may be referred to as a "coupling region." Because of this mutual inductance relationship, the wireless power transfer may be referred to as inductive wireless power transfer.

The transmit coil 222 and the receive coil 252 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 252 within a plane of the transmit coil 222 where the coupling region of the transmit coil 222 may be more powerful.

The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which the wireless power signal 230 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured with both the wireless power transmitting apparatus 110 and the wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter. Moreover, either of the wireless power transmitting apparatus 110 and the wireless power receiving apparatus 120 may be referred to herein as a wireless power enabled apparatus or a wireless power enabled device.

Figure 2:
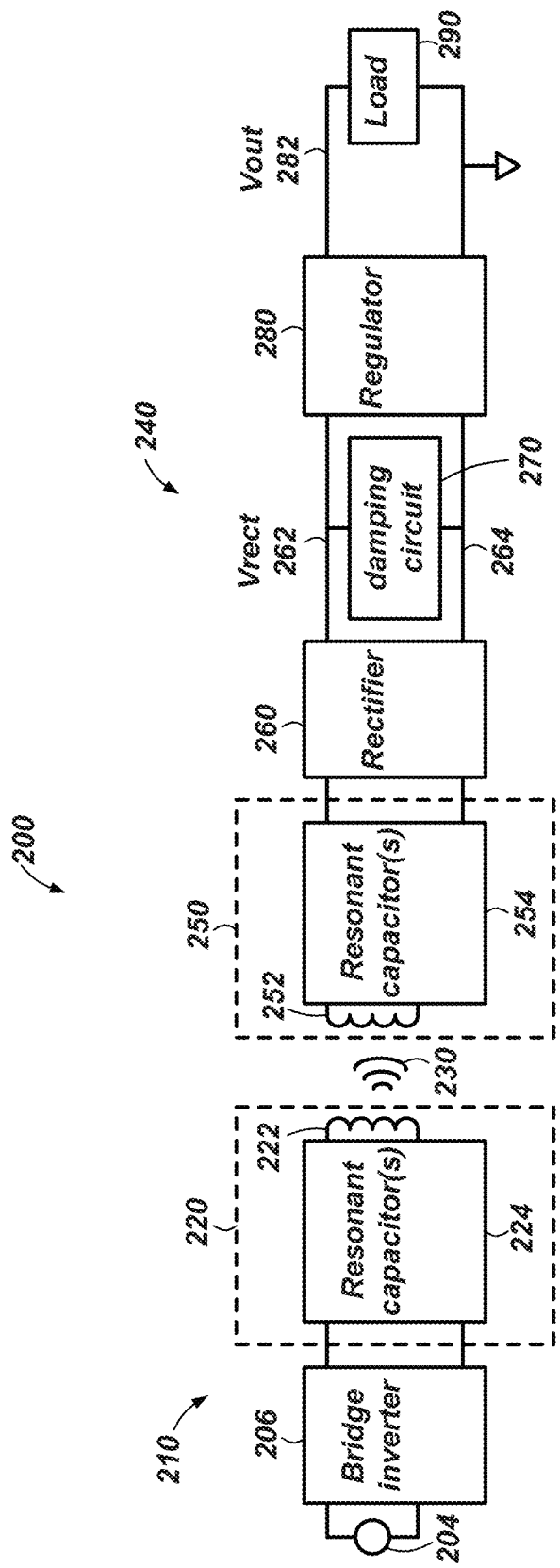
FIG. 2 is a more detailed schematic block diagram of a wireless power transfer system.

FIG. 2 is a more detailed schematic block diagram of a wireless power transfer system 200. The wireless power transfer system 200 includes a wireless power transmitter 210 and a wireless power receiver 240. The wireless power transmitter 210 and the wireless power receiver 240 may be configured to couple with each other according to a mutual inductance relationship such that wireless power signal 230 may be transferred from the wireless power transmitter 210 to the wireless power receiver 240.

The wireless power transmitter 210 may include a transmit resonant tank 220, a bridge inverter 206, and control logic (not shown) coupled together to generate the wireless power signal 230 transmitted to the wireless power receiver 240. The transmit resonant tank 220 may include a transmit coil 222 coupled with one or more transmit resonant capacitors 224. The bridge inverter 206 of the wireless power transmitter 210 may include a full bridge inverter, a half bridge inverter, or other appropriate circuit for receiving a DC input signal 204 and generating an AC signal through the transmit coil 222 for generating the wireless power signal 230.

The wireless power receiver 240 includes a receive resonant tank 250, a rectifier 260, and a regulator 280. A damping circuit 270 is also included, which is explained more fully below in combination with FIGS. 4 and 5. The regulator 280 generates an output voltage ($V_{OUT}$) 282 in response to a rectified power signal (Vrect) 262 from the rectifier 260. The output voltage 282 may be provided to a load 290 (e.g., a battery, system components, etc.). The receive resonant tank 250 may include the receive coil 252 coupled with one or more receive resonant capacitors 254. The wireless power transmitter 210 and the wireless power receiver 240 may be incorporated within a wireless power transmitting apparatus 110 (FIG. 1) and a wireless power receiving apparatus 120 (FIG. 1), respectively. The transmit coil 222 and the receive coil 252 (and other components) may be sized according to the particular devices and applications to be associated therewith.

The wireless power transmitter 210 and the wireless power receiver 240 may be generally configured as discussed above with respect to FIG. 1. The configurations of the LC networks within the transmit resonant tank 220 and the receive resonant tank 250 may generally determine the resonant frequencies of the wireless power transmitter 210 and the wireless power receiver 240, respectively. For example, the resonant frequency of the resonant tanks (220, 250) may be based on the inductance of their respective inductive coil (222 and 252) and the capacitance of the capacitors (224 and 254).

During wireless power transmission, the DC input signal 204 may be received by the bridge inverter 206. The bridge inverter 206 may generate an AC current that flows through the transmit resonant tank 220 to generate a time-varying signal for transmitting the wireless power signal 230. Thus, the wireless power signal 230 may be a time-varying signal that is substantially sinusoidal, having a frequency that may be based on the switching frequency of the bridge inverter 206 of the wireless power transmitter 210. In some embodiments, the frequency of the wireless power signal 230 may be set according to a desired frequency, such as a frequency for a particular wireless power standard. The transmit resonant tank 220 may be configured such that the resonant frequency is approximately the frequency of the wireless power signal 230. In some embodiments, it may be desirable for the frequency of the wireless power signal 230 to differ somewhat from the resonant frequency of the transmit resonant tank 220, such as to reduce the peak-to-peak current through the transmit coil 222.

In order to receive the wireless power signal 230, the wireless power receiver 240 may be placed in the coupling region of the wireless power transmitter 210 such that coupling (e.g., inductive, magnetic, or a combination thereof) coupling may be achieved. As a result, the wireless power receiver 240 may receive the wireless power signal 230 and generate an AC power responsive thereto. In order for the power to be used by the load 290, the AC power may be converted to a DC power. The rectifier 260 may generate a rectified voltage ($V_{RECT}$) 262 as well as a rectified current ($I_{RECT}$) flowing through the receive resonant tank 250.

Figure 3:
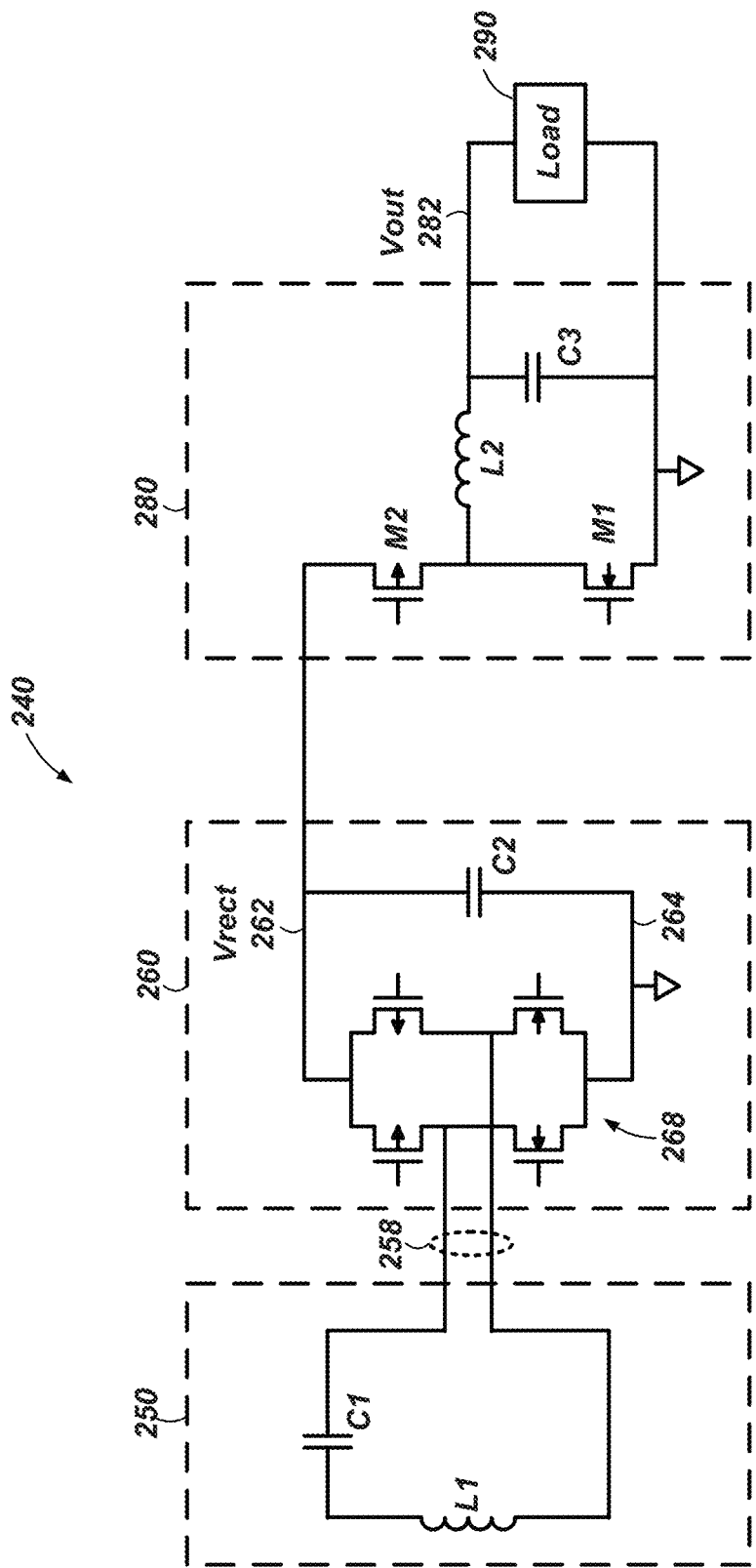
FIG. 3 is a detailed schematic block diagram illustrating a wireless power receiver.

FIG. 3 is a detailed schematic block diagram illustrating a wireless power receiver 240 in more detail. The receive resonant tank 250 is illustrated with inductor L1 as the receive coil 252 (FIG. 2) and capacitor C1 as the one or more receive resonant capacitors 254 to generate an AC power signal 258.

In some embodiments, the rectifier 260 may be configured as a synchronous rectifier. As a result, the rectifier 260 may include one or more switches (e.g., transistors) that are controlled in such a manner to generate the DC output power signal (i.e., rectified voltage ($V_{RECT}$) and rectified current ($I_{RECT}$)). The combination of the rectified voltage ($V_{RECT}$) and rectified current ($I_{RECT}$) may also be referred to herein as a DC rectified power signal 262 relative to a rectified ground 264. In some embodiments, the rectifier 260 may include one or more diodes in a bridge configuration configured to generate the DC rectified power signal 262. An output capacitor C2 may be included to smooth variations in the DC rectified power signal 262.

The regulator 280 may receive the rectified voltage 262 and convert the rectified voltage 262 to have a desired voltage level for the output voltage 282. For example, in some embodiments, the regulator 280 may convert the rectified voltage 262 from a low voltage to a relatively higher voltage for the output voltage 282. In some embodiments, the regulator 280 may convert the rectified voltage 262 from a high voltage to a relatively lower voltage for the output voltage 282. In some embodiments, the regulator 280 may invert the rectified voltage 262 from a positive voltage to a negative voltage, or vice versa. The regulator 280 may be configured according to one of a variety of different voltage regulator topologies. For example, the regulator 280 may be configured according to one or more of a buck topology, a boost topology, a buck-boost topology, an inverting topology, and a low dropout (LDO) topology. In some embodiments, the regulator 280 may be configured according to a transformer-based topology (e.g., forward, flyback, etc.). The operation of the regulator 280 may be controlled by control logic (not shown) according to the topology being used.

As a more detailed example, FIG. 3 illustrates the regulator 280 as a buck regulator. The regulator 280 receives the DC rectified power signal 262 and converts it to a lower voltage by controlling transistors M1 and M2 to generate a pulse-width-modulated signal that is filtered by a combination of inductor L2 and capacitor C3 to become the output voltage 282. As stated earlier, the output voltage 282 may drive a load 290, which may include a variety of loads within and electronic device.

Figure 4:
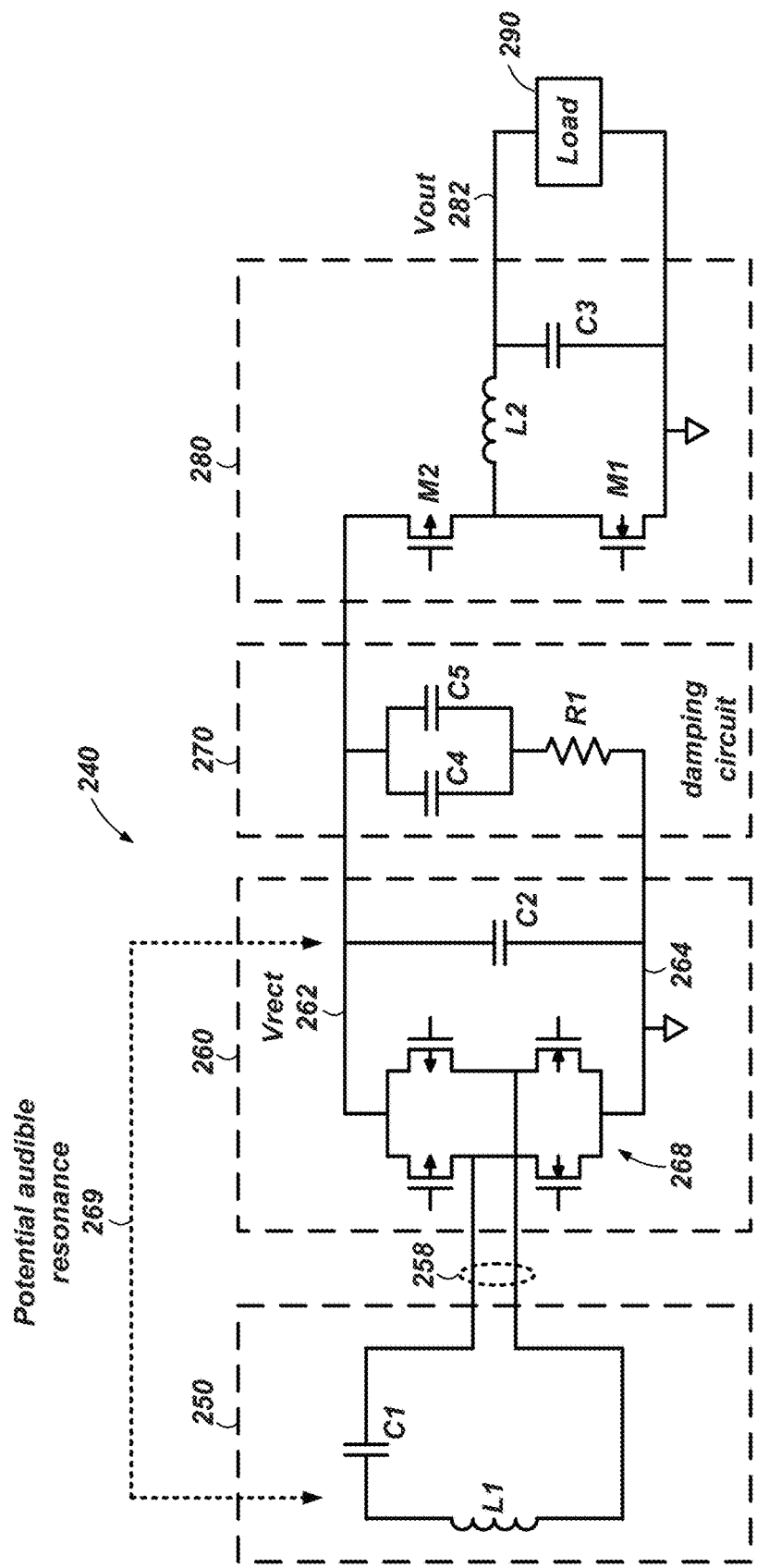
FIG. 4 is a detailed schematic block diagram illustrating a wireless power receiver including a damping circuit.

FIG. 4 is a detailed schematic block diagram illustrating a wireless power receiver including a damping circuit. In FIG. 4 the details of the receive resonant tank 250, the rectifier 260, the voltage regulator 286 and the load 290 are the same as those for FIG. 3 and need not be explained again. FIG. 4, however, includes the damping circuit 270.

At certain loads, and with certain regulators 280, a potential audible resonance 269 may develop and an audible frequency of about 6-10 kHz (typically about 8 kHz) develops, which may be perceived to be emitted from receiver units containing constant-input-power regulators such as buck regulators. This audio emission may be occurring as a result of a resonance occurring between the output capacitor C2 of the rectifier 260 and the inductor L1 of the receive resonant tank 250 or other residual inductances.

The beat frequency of 8 kHz may be converted into audible oscillations due to the piezoelectric effect of the existing output capacitor C2. This resonance indicates an input filter instability effect, familiar to designers of conventional switching regulators, but in an entirely new form. The oscillation may occur at certain combinations of the output impedance of the rectifier 260, combined with the input impedance of the regulator 280 connected to the power load 290. In other words, at some power levels, the input impedance of the regulator 280 may combine with the output impedance of the rectifier 260 in such a way as to create the audible harmonics.

The damping circuit 270 provides a damping impedance that dampens the oscillation by paralleling the output capacitor C2 with a relatively large capacitance of about 1-20 microfarads in series with a resistance of about 2-5 ohms. This damping circuit 270 dampens or significantly reduces the audible beat frequency of 8 kHz.

In the specific embodiment illustrated in FIG. 4, the capacitance of the damping circuit 270 is developed with two 22 microfarad capacitors in parallel, which are coupled to a 5 ohm resistor in series to develop the resistance between the rectified voltage 262 and the rectified ground 264.

Figure 5:
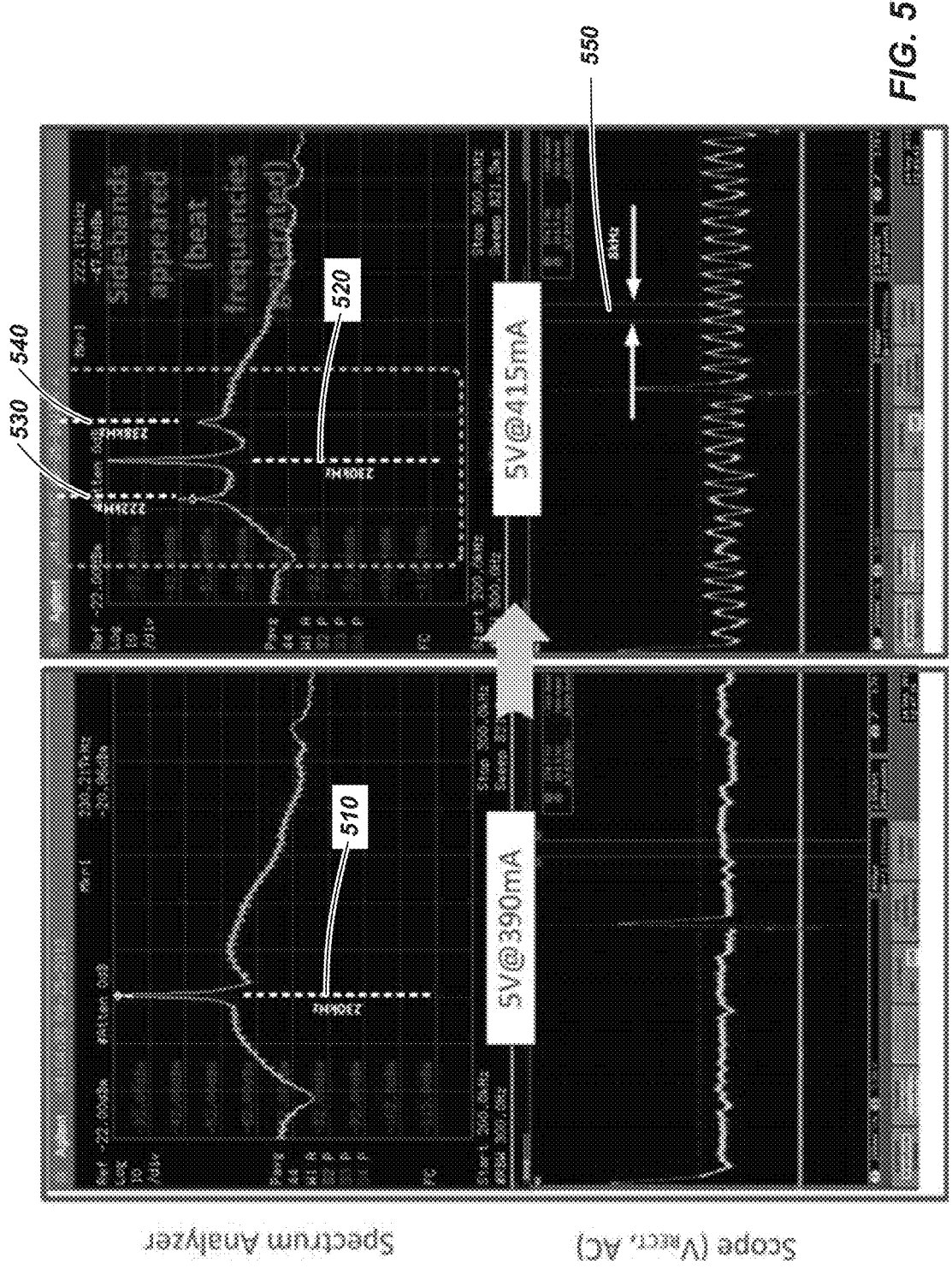
FIG. 5 includes graphs illustrating sideband frequencies that may generate audible harmonics at some loads.

FIG. 5 includes graphs illustrating sideband frequencies (530, 540) that may generate audible harmonics at some loads. In FIG. 5 the two upper graphs show spectrum analyzer graphs of the rectified voltage 262 (FIG. 4) at two different power levels on the load 290 (FIG. 4). The lower two graphs show scope graphs of the rectified voltage 262 at the two different power levels on the load 290. The left side graphs illustrate a load of about 5 volts at about 390 milliamps. The right side graphs illustrate a load of about 5 volts at about 415 milliamps. The peak 510 illustrates the resonant frequency of the receive resonant tank 250 (FIG. 4) when there are no audible harmonics present.

The upper right graph illustrates a similar peak 520 for the resonant frequency of the receive resonant tank 250, but also illustrates sideband peaks (530, 540), which indicate that a basic transmitter frequency of 230 kHz, was breaking up to include two sideband peaks at sideband frequencies of about 230−8=222 kHz and of 230+8=238 kHz. The damping circuit 270 (FIG. 4) substantially eliminates these sideband frequencies such that the spectrum appears similar to that of the upper left graph. The lower right graph illustrates a ripple on the rectified voltage 262 of about 8 kHz when the sideband frequencies (530, 540) are present.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power enabled apparatus, comprising:
a wireless power receiver, including:
a receive coil configured to generate an AC power signal responsive to a wireless power signal at a frequency;
a rectifier configured to receive the AC power signal and generate a DC rectified power signal relative to a rectified ground;
a regulator operably coupled with the rectifier to receive the DC rectified power signal and generate an output voltage; and
a damping circuit operably coupled between the DC rectified power signal and the rectified ground and in parallel with the regulator, the damping circuit configured to suppress harmonics of the frequency that produce audible harmonics at the wireless power receiver by providing a damping impedance for the DC rectified power signal at the harmonics of the frequency, the harmonics of the frequency producing the audible harmonics at some loads on the regulator.

2. The wireless power enabled apparatus of claim 1, wherein the damping circuit comprises a discrete resistor in series with one or more discrete capacitors.

3. The wireless power enabled apparatus of claim 2, wherein the discrete resistor comprises a resistance of one to five ohms.

4. The wireless power enabled apparatus of claim 2, wherein the one or more discrete capacitors comprise capacitance of one to twenty microfarads.

5. The wireless power enabled apparatus of claim 2, wherein the one or more discrete capacitors comprise two 22 microfarad capacitors in parallel and the discrete resistor comprises a five ohm resistor.

6. The wireless power enabled apparatus of claim 1, further comprising an electronic device including the wireless power receiver.

7. The wireless power enabled apparatus of claim 6, further comprising a load operably coupled with the wireless power receiver to receive the output voltage.

8. The wireless power enabled apparatus of claim 7, wherein the load includes at least one of a battery of the electronic device and system components of the electronic device.

9. The wireless power enabled apparatus of claim 1, wherein the regulator is selected from the group consisting of a buck converter, a boost converter, and a buck-boost converter.

10. A wireless power receiver, comprising:
a receive coil configured to generate an AC power signal at a resonant frequency responsive to a wireless power signal;
a rectifier configured to receive the AC power signal and generate a rectified voltage and a rectified ground in response thereto;
a regulator configured to receive the rectified voltage and generate an output voltage in response thereto; and
a damping circuit operably coupled between the rectified voltage and the rectified ground, the damping circuit configured to suppress sideband frequencies relative to the resonant frequency, wherein the sideband frequencies generate audible harmonics at certain loads on the regulator when the sideband frequencies are not suppressed.

11. The wireless power receiver of claim 10, wherein the damping circuit comprises a resistor in series with one or more capacitors.

12. The wireless power receiver of claim 11, wherein the resistor comprises a resistance of one to five ohms.

13. The wireless power receiver of claim 11, wherein the one or more capacitors comprise a capacitance of one to twenty microfarads.

14. The wireless power receiver of claim 11, wherein:
the one or more capacitors comprise two 22 microfarad capacitors in parallel; and the resistor comprises a five ohm resistor.

15. The wireless power receiver of claim 10, further comprising a load for an electronic device including the wireless power receiver, the load including at least one of a battery of the electronic device and system components of the electronic device.

16. A method of operating a receiver side of a wireless power transfer system, the method comprising:
generating an AC power signal responsive to a wireless power signal exciting a receive coil at a resonant frequency;
rectifying the AC power signal to generate a DC rectified power signal and a rectified ground; generating an output voltage from the DC rectified power signal with a voltage regulator; and
suppressing sideband frequencies relative to the resonant frequency by providing a damping impedance between the DC rectified power signal and the rectified ground, wherein the sideband frequencies generate audible harmonics at certain loads when the sideband frequencies are not suppressed.

17. The wireless power receiver of claim 16, wherein providing the damping impedance further comprises providing a resistance in series with a capacitance.

18. The wireless power receiver of claim 17, wherein providing the resistance in series with the capacitance comprises providing a resistance of one to five ohms and providing a capacitance of one to 20 microfarads.

19. The method of claim 16, further comprising providing power through the output voltage to an electronic device including the receive coil.

20. The wireless power enabled apparatus of claim 19, further comprising operably coupling the output voltage to a load of the electronic device, wherein the load includes at least one of a battery of the electronic device and system components of the electronic device.

* * * * *